United States Patent [19]

Spitznagel

[11] Patent Number: 5,439,332
[45] Date of Patent: Aug. 8, 1995

[54] PNEUMATIC SPOT WELD DRILL

[76] Inventor: Max W. A. Spitznagel, 13207 Warren Ave., Los Angeles, Calif. 90066

[21] Appl. No.: 75,997

[22] Filed: Jun. 11, 1993

[51] Int. Cl.⁶ .................. B23B 45/14; B23B 47/08; B23B 47/22
[52] U.S. Cl. ........................ 408/84; 408/95; 408/130
[58] Field of Search .............. 408/84, 87, 95, 130, 408/702

[56] References Cited

U.S. PATENT DOCUMENTS

| | | | |
|---|---|---|---|
| 2,488,992 | 11/1949 | Taylor | 408/130 X |
| 2,909,949 | 10/1959 | Winslow | 408/95 X |
| 5,046,900 | 9/1991 | Heiter et al. | 408/84 |

OTHER PUBLICATIONS

Wielander Schill Pamphlt Article No. 4041 re. Vario Drill WS 90 spotweld remover.

Primary Examiner—Steven C. Bishop

[57] ABSTRACT

A small, portable, light-weight pneumatic spot weld drill comprises a drill housing assembly which includes a trigger assembly for providing a supply of pressurized gas. A piston assembly is positioned within the drill housing assembly and is axially translatable thereto. The piston assembly is actuated by the pressurized gas so as to provide cutting pressure for the drill bit. A motor assembly is contained within the drill housing assembly. The motor assembly has a rotatable output shaft for securing a drill bit and for providing rotary movement of that drill bit. A control valve is provided for receiving a supply of the pressurized gas and for controllably discharging the pressurized gas to the motor assembly. The control valve provides cutting pressure at a desired level and provides rotary motion of the drill bit.

12 Claims, 6 Drawing Sheets

PNEUMATIC SPOT WELD DRILL

BACKGROUND OF THE INVENTION

1. Field of the Invention

This invention relates to spot weld removal and more particularly to a spot weld drill that uses a pneumatically actuated piston for providing cutting pressure for a drill bit.

2. Description of the Related Art

A spot weld is a commonly used technique for holding two pieces of sheet metal or other material together. A spot weld is formed by placing two pieces of sheet metal in facing contact with each other and connecting the two sheets into an electric welding circuit. Two small diameter cylindrical electrodes are placed on opposite sides of the position to be welded. The two surfaces to be welded are compressed together by the electrodes as electrical current is passed between the electrodes to heat the spot weld area. The interface between the two metal sheets becomes heated sufficiently to weld the two sheets together at a small spot in the vicinity of the two electrodes.

The common application for spot welding is in automobiles where fender quarter panels or other body parts are secured to structural members. It is often necessary to remove these panels, such as when an automobile must be repaired following an accident.

In addition to removal of panels for repair or replacement following an accident, it is often necessary to remove an undamaged panel from an automobile that is being salvaged. After removal, the panel is then substituted for a panel that has been damaged.

While hood panels are typically removed by using an air chisel, grinder, or drill bit, in order to minimize damage to the parts involved, it is desirable to drill through one of the two fastened parts only to the depth of the facing surfaces between the two parts. In this way only one of the parts is damaged by the drill and the other remains substantially intact.

Metal is a difficult material to drill through and frequently the spot welds are positioned in inconvenient, hard-to-get-at locations. It can thus be quite difficult to drill through the spot weld interface without drilling at least part way through the second panel. The problem becomes even worse when relatively unskilled labor is used to perform the drilling operation.

To provide a relatively long drill life it is desirable to provide a high cutting pressure, i.e., about 100-120 pounds. This is difficult for a person to sustain if he can only use his own muscle to provide this cutting pressure.

It is also highly desirable to have a depth stop that can control the depth of the drilling operation. Wielander Schill, a German company, discloses the use of a C-arm assembly with a spot weld remover drill. The C-arm has a leg that is hooked over the back side of the panel joint and provides the action for the cutting pressure. Thus, control of the depth of the drilling operation may be maintained. However, the user must still provide significant muscle in providing sufficient cutting pressure for the drill bit.

OBJECTS AND SUMMARY OF THE INVENTION

Accordingly, it is a principal object of the present invention to minimize fatigue of the technician while removing spot welds.

It is another object of the present invention to extend the drill life of the drill bit of a spot weld remover by providing the proper cutting pressure.

These and other objects are achieved by the present invention which is a small, portable, light-weight pneumatic spot weld drill. In its broad aspects, the spot weld drill comprises a drill housing assembly which includes a trigger assembly for providing a supply of pressurized gas. A piston assembly is positioned within the drill housing assembly and is axially translatable thereto. The piston assembly is actuated by the pressurized gas so as to provide cutting pressure for the drill bit. A motor assembly is contained within the drill housing assembly. The motor assembly has a rotatable output shaft for securing a drill bit and for providing rotary movement of that drill bit. A control valve is provided for receiving a supply of the pressurized gas and for controllably discharging the pressurized gas to the motor assembly. The control valve provides cutting pressure at a desired level and provides rotary motion of the drill bit.

The spot weld drill is preferably used with a removable C-arm assembly which is attachable to the drill housing assembly. The C-arm assembly has a leg which is hooked to a back side of a spot weld to be drilled, thereby providing reaction for the cutting pressure in drilling applications where both sides of the spot weld are accessible.

In a first embodiment, the motor assembly and the piston assembly move axially as an integral unit within the drill housing assembly. In this embodiment the trigger assembly includes means for providing pressurized gas to a back side of the piston assembly when the trigger is pulled, thereby providing cutting pressure by moving the piston assembly and motor assembly toward the spot weld. A spring is used for retracing the piston assembly and motor assembly away from the spot weld when the trigger is in a neutral (released) position. This embodiment is generally dedicated only for spot weld removal applications.

In a second embodiment the trigger assembly comprises means for providing pressurized gas to a back side of the piston assembly when the trigger is in a neutral (released) position. This pushes the C-arm assembly forward in a direction away from the drill bit. The trigger assembly also includes means for providing pressurized gas to a front side of the piston assembly when the trigger is pulled, simultaneously releasing gas located at the back side of the piston assembly, thereby providing the cutting pressure by moving the C-arm assembly toward the drill bit. This embodiment has universal applications for spot weld removal, drilling, mixing, and other general uses.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures of the drawings are designated by the same reference characters.

DETAILED DESCRIPTION OF THE PREFERRED EMBODIMENTS

Figures 1, 2:
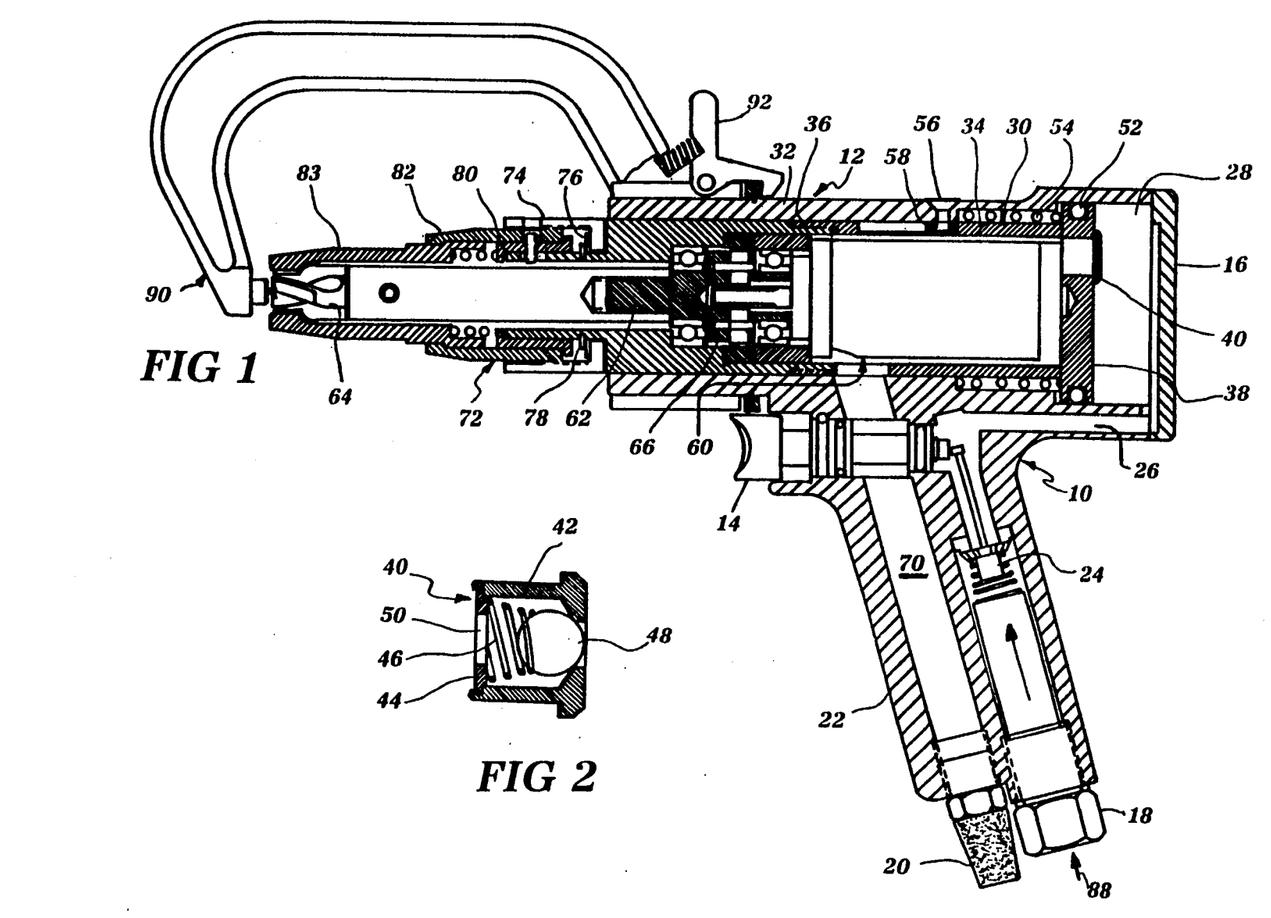
FIG. 1 is a cross-sectional view of a first embodiment of the present invention in which pressurized gas is introduced to the back side of the piston assembly for providing cutting pressure.
FIG. 2 illustrates a control valve, partially in cross-section, which may be utilized with the spot weld drill of FIG. 1.

Referring to the drawings and the characters of reference marked thereon, FIG. 1 is a cross-sectional view of a first embodiment of the pneumatic spot weld drill of the present invention, designated generally as 10. Spot weld drill 10 is dedicated for drilling out spot welds, as will be explained in detail below. A drill housing assembly 12 includes a positive action trigger assembly 14 for providing a supply of pressurized gas. The trigger assembly 14 may be of a conventional type well known in the pneumatic tool industry. The back end of the drill housing assembly includes an end cap 16. A conventional inlet fitting 18 and outlet exhaust muffler 20 are attached to the handle 22 of the drill housing assembly 12. Handle 22 contains a valve 24 operable with the remainder of the trigger assembly 14, as is well known in this industry. Valve 24 provides fluid communication with an airway 26. Airway 26 leads to an air chamber 28 located at the rear of the drill housing assembly 12.

A piston assembly 30 is contained within the main portion of the drill housing assembly 12 and is axially translatable thereto. The piston assembly 30 includes a forward portion 32 securely connected to a rear portion 34 by threads 36. The rear end of the piston assembly 30 comprises a piston end 38 which forms a side of air chamber 28. Piston 38 supports a control valve 40.

Referring now to FIG. 2, it may be seen that control valve 40 comprises a control valve housing 42, a back washer 44, a spring 46, and a ball 48. It is understood that the particular control valve illustrated herein is for the purpose of illustration and not limitation. Control valve 40 may include other designs such as a reed valve, a plunger valve (such as that described in FIG. 9, below), or other conventional valve means. The outlet 50 of the control valve 40 provides for a gas pressure to run the motor assembly, as will be explained below.

Sealing means such as an O-ring 52 is utilized to seal the outer periphery of the piston end 38 from the inner surface of the housing assembly 12. The piston end 38 cooperates with spring bias means 54 positioned between the rear portion 34 and the drill housing assembly 12 for providing piston assembly return pressure. A screw 56 and key 58 are operable in a conventional manner to prevent relative rotation between the housing assembly 12 and the piston assembly 30.

A motor assembly 60 is contained within the piston assembly 30 and contains a rotatable output shaft 62 for securing a drill bit 64. Motor assembly 60 may comprise any number of conventional pneumatic rotary motors which are well known in the pneumatic tool industry and marketed, for example, by companies such as Chicago Pneumatic, Ingersoll-Rand, Cooper Tools, Snap-On Tools, and Mac Tools. The motor assembly 60 includes a conventional reduction gear assembly 66 which drives the output shaft 62. Output air from the motor assembly 60 exits the exhaust port 68 and flows through an exhaust manifold 70 through the exhaust muffler 20.

A depth adjustment assembly 72 is attached to the forward portion 32 of the piston assembly 30 for providing the desired drilling depth. Depth adjustment assembly 72 includes a knurled adjustment sleeve 74 which is secured axially relative to the piston assembly 30 by a washer 76 and lock ring 78. An inner sleeve 80 serves as a bearing or guide for an intermediate sleeve 82 which encloses a drill stop sleeve 83. A spring 84 biases the drill stop sleeve 83 in a forward position. The drill stop sleeve 83 is machined on both sides to form two longitudinally extending fingers having two slots or windows defined between them. The windows enable an operator to easily view and position the drill bit during operation. A lock screw 86 engages a slot in the forward portion 32 of the piston assembly 30 to stop the intermediate sleeve 82 from rotating when adjusting the depth on the knurled adjustment sleeve 74.

A C-arm assembly 90 is attachable to the drill housing assembly 12 by a locking element 92. The C-arm assembly 90 can be rotated more than 300 degrees relative to the drill housing assembly 12; however, it is locked axially relative to the drill housing assembly 12. The C-arm assembly 90 provides reaction for the cutting pressure in drilling applications where both sides of the spot weld are easily accessible.

Figure 3:
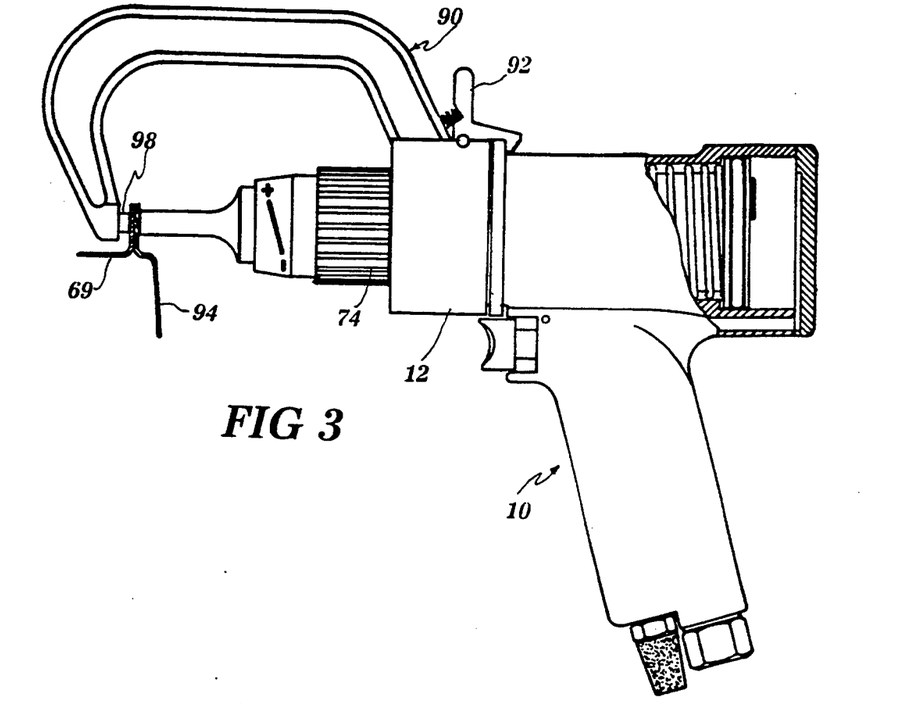
FIG. 3 shows the spot weld drill of FIG. 1, with a C-arm assembly attached for removal of a spot weld.

Referring now to FIG. 3, the spot weld drill 10 is illustrated relative to a work piece. As noted above, it is desired that the spot weld be drilled out of a first panel 94 without significantly penetrating the second panel 96. In operation, air flows through the inlet 18 in the direction shown by arrow 88. When the trigger assembly 14 is actuated, air flows through valve 24 and through airway 26 into air chamber 28. The piston assembly 30 moves forward in the direction of the C-arm assembly 90 and panels 94, 96. It is stopped when contact is made with a pad 98 and the end of the C-arm assembly 90. At that time, pressure builds up in the air chamber 28. The control valve 40 provides a predetermined pressure, for example, about 50 psi. At that predetermined pressure the control valve 40 opens and air moves through the rotary motor assembly 60 driving the drill bit 64. The air is exhausted through the exhaust manifold 70 and exhaust muffler 20. Thus, the pressure behind the piston end 38 provides a cutting pressure for the drill bit 64.

Figure 4:
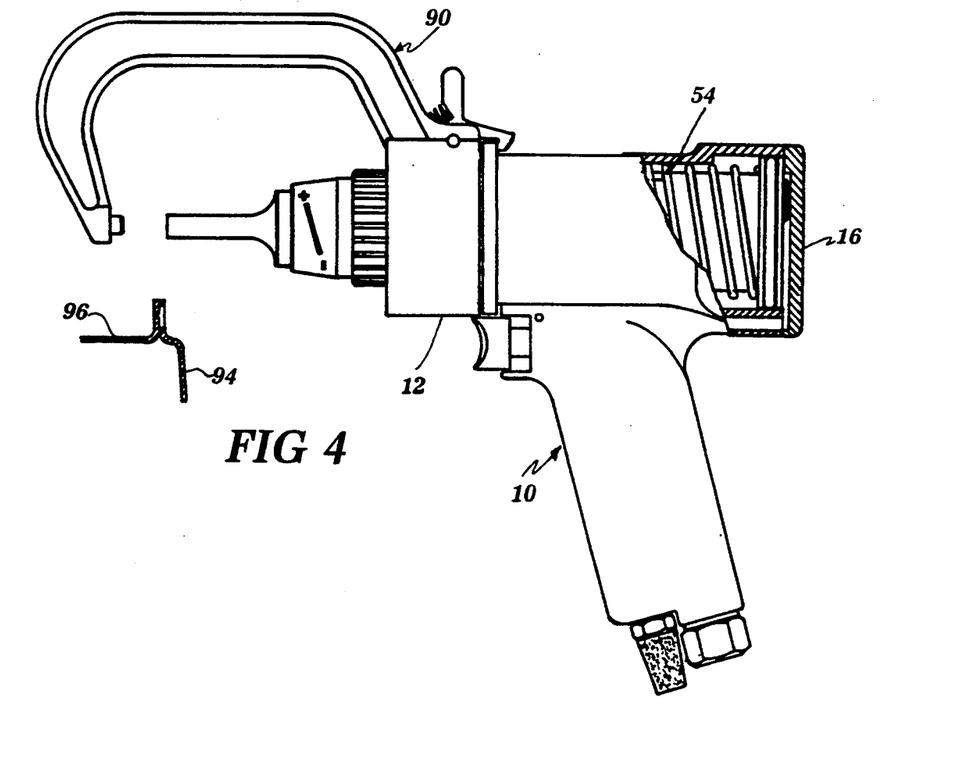
FIG. 4 shows the spot weld drilled out and the motor assembly retracted.

Referring now to FIG. 4, when the trigger is released, the spring 54 pushes the motor assembly 60 back toward the end cap 16. (The C-arm assembly is rotatable on its axis for easy access.)

Figure 5:
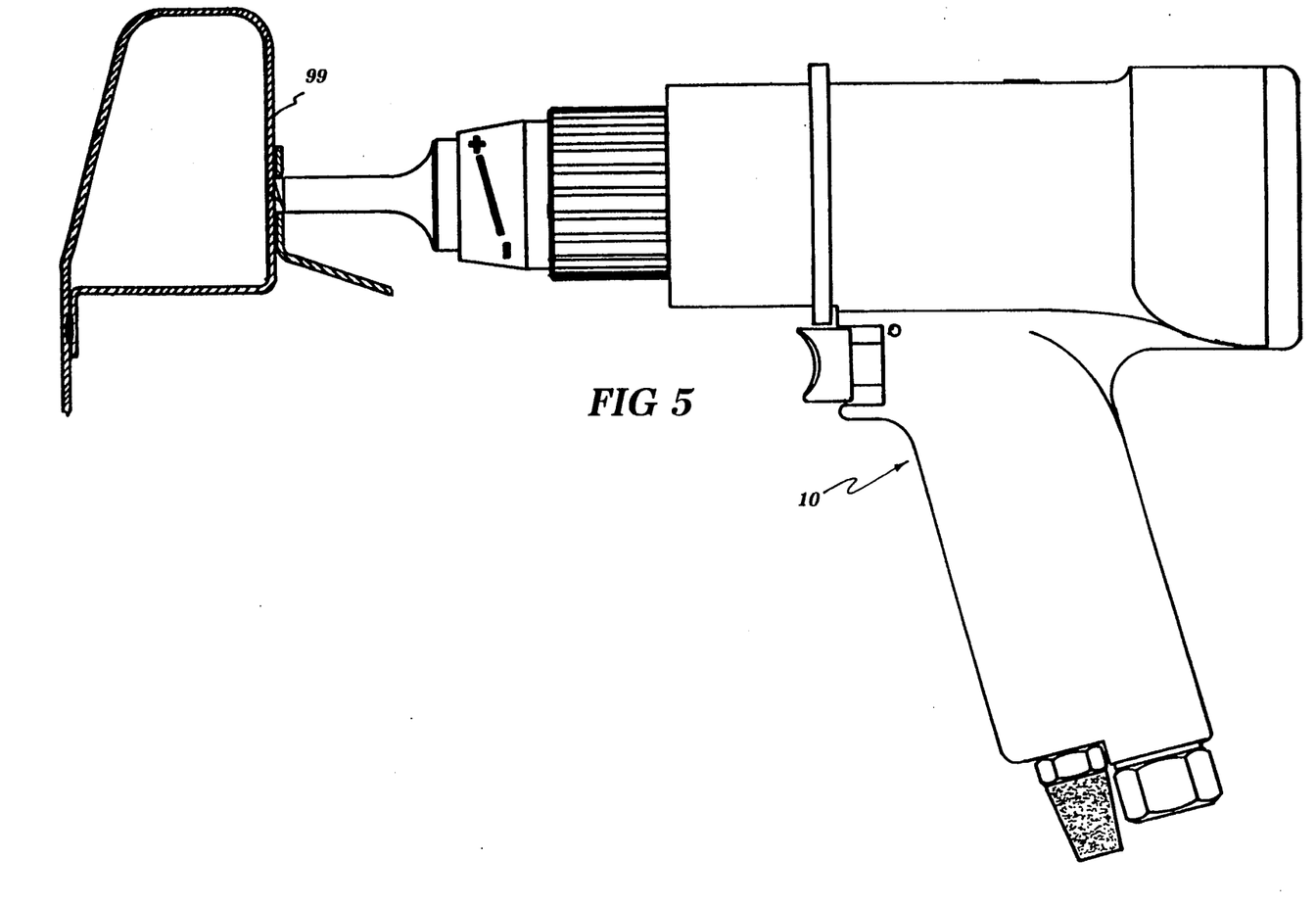
FIG. 5 illustrates the use of the spot weld drill in an instance where the spot weld is only accessible at one side and the C-arm assembly is therefore removed.

Referring now to FIG. 5, it can be seen that the C-arm assembly 90 can be removed to provide utilization of the present invention to lift spot welds on a "box section" 99 which are accessible only on one side.

Figures 6, 9:
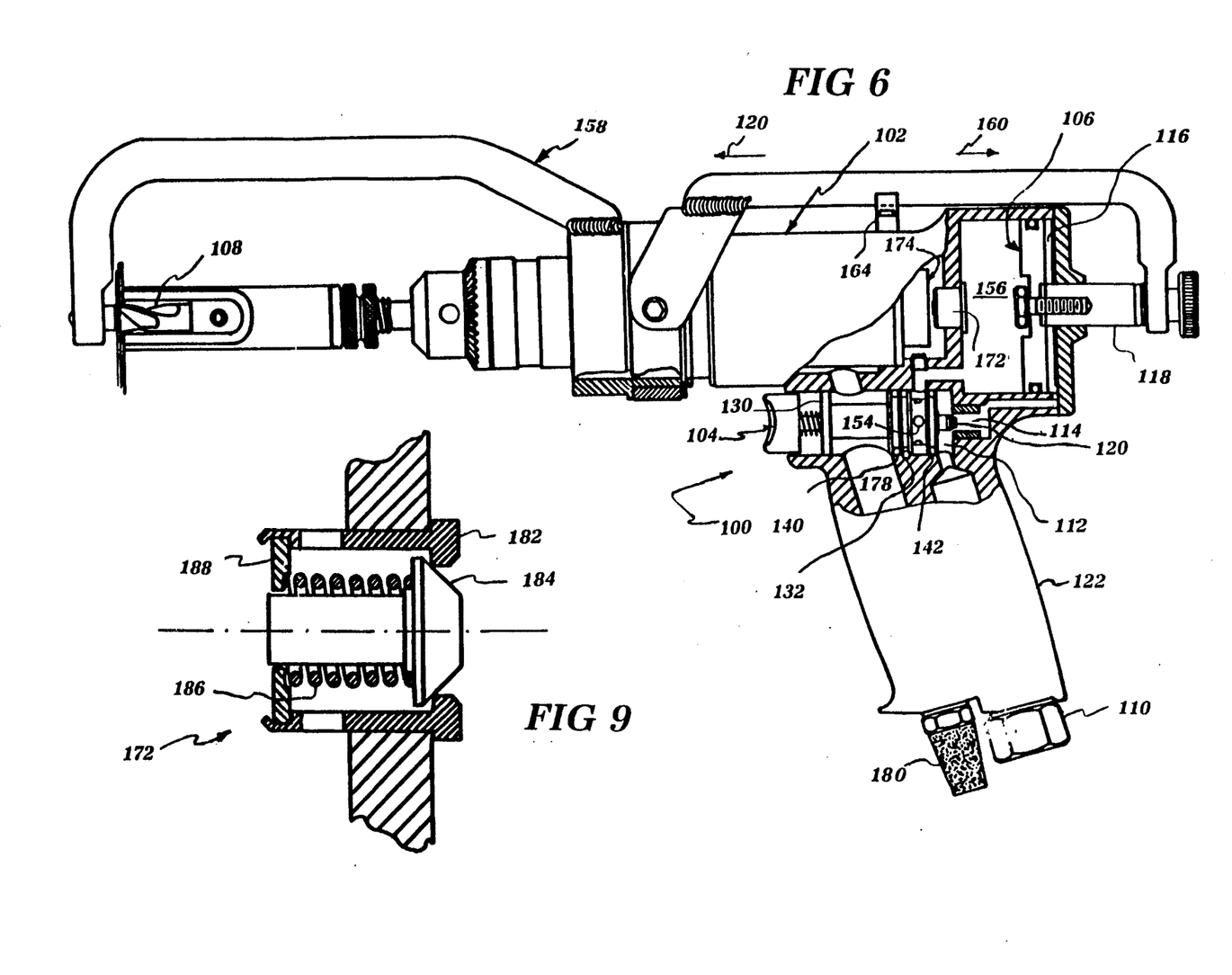
FIG. 6 illustrates a second embodiment of the present invention in which air pressure may be introduced to the back side of the piston so as to push the C-arm assembly forward while the trigger is in a neutral position and providing gas to the front side of the piston for providing cutting pressure when the trigger is pulled.
FIG. 9 is an illustration of the control valve used in the FIG. 6 embodiment, shown in partial cross-section.

Referring now to FIG. 6, a second embodiment of the present invention is illustrated, designated generally as 100. This embodiment, as will be explained in detail below, may be used to drill out spot welds and can also be used as a normal air drill. As in the previous embodiment, a drill housing assembly 102 includes a trigger assembly 104 for providing a supply of pressurized gas. As piston assembly 106 is positioned within the drill housing assembly 102 and axially translatable thereto. The piston assembly 106 is actuated by pressurized gas so as to provide cutting pressure for the drill bit 108. An intake fitting 110 provides air to a pressurized intake airway 112. The trigger assembly 104 is of positive action so that in the neutral position pressurized air flows into the neutral position airway 114. Air flows through airway 114 to the back side of the piston within backside chamber 116. Thus, a pull/push rod 118 is pushed forward in the direction of arrow 120.

Figure 8:
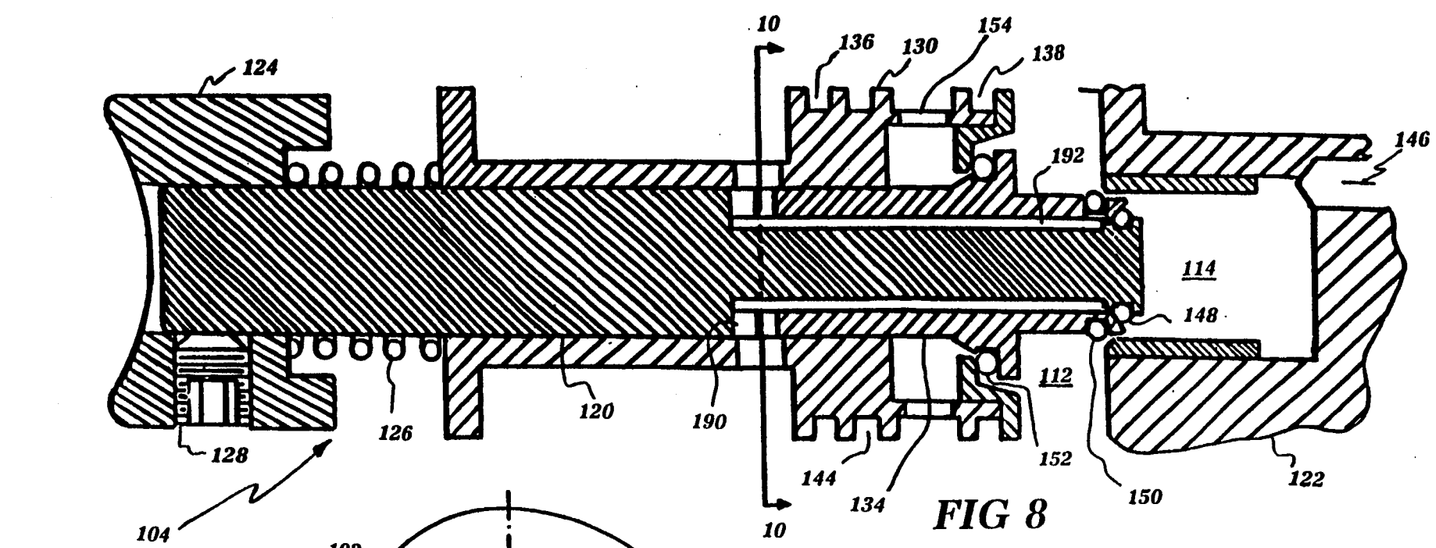
FIG. 8 is an enlarged cross-sectional view of the trigger assembly utilized in the FIG. 6 embodiment.

Referring now to FIG. 8, an enlarged view of the trigger assembly 104 is illustrated. Trigger assembly 104 includes an elongated trigger shaft 120 which extends into the handle 122 of the housing assembly 102. A trigger 124 is biased by a spring 126 and securely supported by a set screw 128. Trigger shaft 120 is supported by the valve body 130 which is secured within the handle 122 by a lock pin 132 (see FIG. 6). A valve sleeve 134 is supported by the trigger shaft 120. Grooves 136, 138 support O-rings 140, 142, respectively. Groove 144 supports lock pin 132. Thus, the trigger assembly 104 is securely positioned within the handle 122.

As previously noted, when the trigger is in the neutral position air is free to flow from the pressurized intake airway 112 to the neutral position airway 114. It may then flow to the back side of the piston as shown by arrow 146.

When the trigger 124 is depressed, the trigger shaft 120 opens the relief valve 148 and closes the cutoff valve 150. At the same time it opens the main valve 152. Thus, air enters ported area 154 and flows into the frontside chamber 156 (see FIG. 6). Thus, the C-arm assembly 158 is pulled in direction 160.

Figure 7:
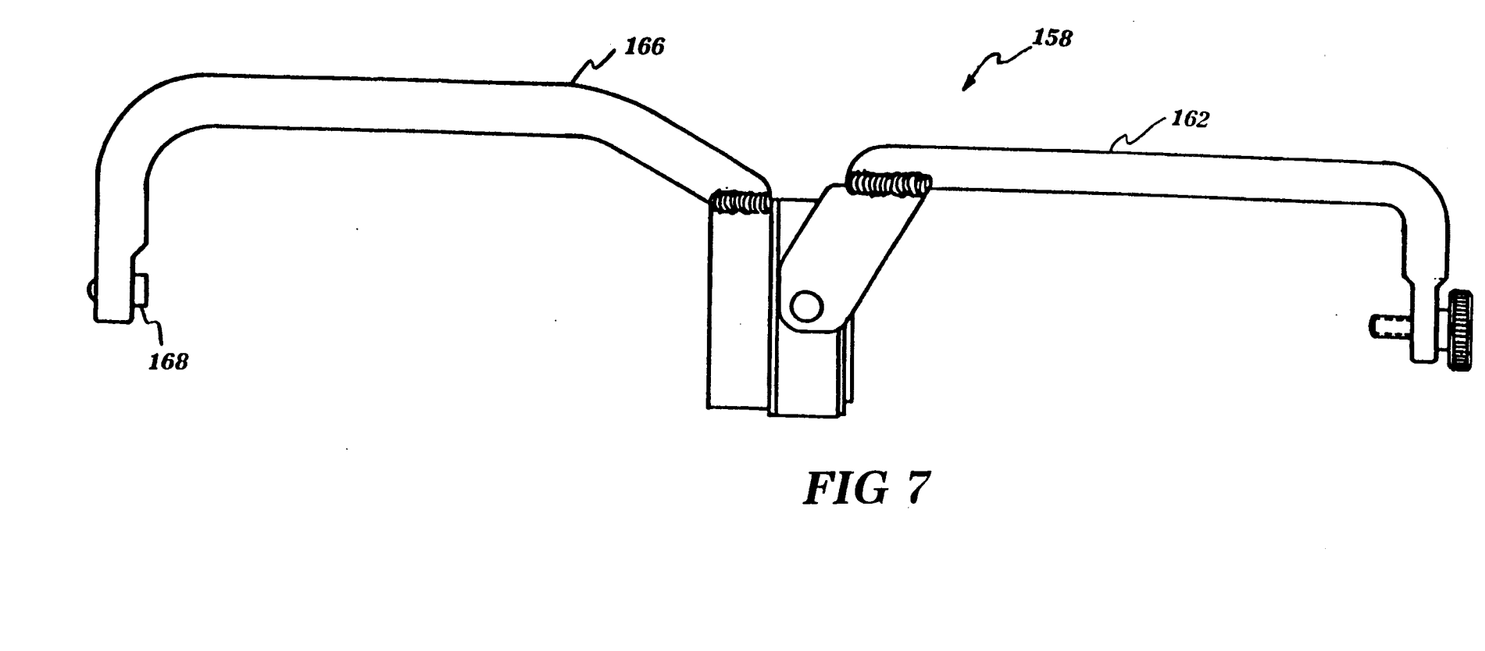
FIG. 7 is an illustration of the C-arm assembly shown in isolation.

Referring now to FIG. 7, the C-arm assembly 158 is shown in isolation. A first C-arm 162 may move axially relative to the drill housing assembly 102; however, it is unable to rotate relative to assembly 102 as a result of a guide 164 (shown in FIG. 6). However, a rotatable C-arm 166 is capable of rotating 360 degrees relative to the drill housing assembly 102 and is also capable of axial movement relative thereto. As in the previous embodiment a pad 168 is located at the end of the C-arm 166.

Thus, it can readily be seen that the piston assembly 106 may move the C-arm assembly 158 backward (i.e., direction of arrow 160), squeezing the workpiece between the drill bit 108 and the pad 168. When a predetermined pressure limit is achieved in frontside chamber 156 air is released through the control valve 172 and into the motor assembly 174. The motor assembly 174 functions to provide rotary movement to the drill bit 108, as described in the previous embodiment. Air is then exhausted through exhaust port 176 and through exhaust manifold 178 to the muffler 180.

Referring now to FIG. 9, the control valve 172 is illustrated. It may be a plunger valve comprising a valve seat 182, valve stem 184, spring 186, and backup washer 188.

Figure 10:
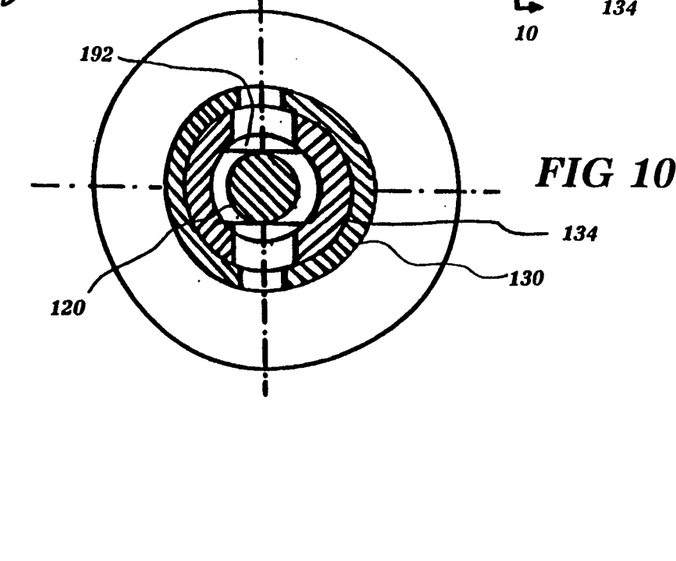
FIG. 10 is a view taken along line 10—10 of FIG. 8.

Referring again to FIG. 8, there is a gap 190 between the trigger shaft 120 and the valve sleeve 134. This assures that the relief valve 148 opens before the main valve 152 opens and the cutoff valve 150 closes. Therefore, air from behind the piston can escape through the relief port 192. Relief port 192 is formed by two flat areas on the trigger shaft 120. These relative dispositions can be seen by reference to FIG. 10.

The spot weld drill 100 of the second embodiment preferably utilizes a spot weld drill guide such as that disclosed and claimed by present applicant in U.S. Pat. No. 5,051,043 entitled "Spot Weld Drill Guide," issued on Sep. 24, 1991. The drill guide attaches to a drill and includes a guide housing having a reference surface defining a reference position that is positionable against a surface being drilled, a drill shaft disposed partly within the guide housing, a bearing supporting the drill shaft within the guide housing and a locking assembly controlling the length of travel of the drill shaft within the guide housing. Windows adjacent to the reference surface of the guide housing enable the drill bit to be accurately positioned over a spot weld prior to drilling to a precise, predetermined bore depth. U.S. Pat. No. 5,051,043 is hereby incorporated by reference.

It is emphasized that the spot weld drill 100 has multiple purposes. The C-arm assembly 158 can be removed for access to one-sided spot welds. Additionally, the drill guide 194 can be removed and the drill motor can be used as an air motor for drilling, screw driving, mixing, buffing, etc.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A pneumatic spot weld drill, comprising:
   a) a drill housing assembly including a trigger assembly for providing a supply of pressurized gas, said drill housing assembly comprising a spring bias means for providing piston assembly return pressure;
   b) a piston assembly positioned within said drill housing assembly and axially translatable thereto, said piston assembly being actuated by said pressurized gas so as to provide cutting pressure for a drill bit;
   c) a motor assembly contained within said drill housing assembly, said motor assembly having a rotatable output shaft, said output shaft for securing a drill bit and for providing rotary movement of said drill bit; and,
   d) a control valve for receiving a supply of said pressurized gas and for controllably discharging said pressurized gas to said motor assembly, said control valve providing said cutting pressure at a desired level and providing rotary motion of said drill bit.

2. The pneumatic spot weld drill of claim 1 wherein said drill housing assembly comprises screw and key means for preventing relative rotation between said drill housing assembly and said piston assembly.

3. The pneumatic spot weld drill of claim 1 further including a removable C-arm assembly attachable to said drill housing assembly, said C-arm assembly having a leg which is hooked to a backside of a spot weld to be drilled, thereby providing reaction for said cutting pressure in drilling applications where both sides of the spot weld are accessible.

4. The pneumatic spot weld drill of claim 1 wherein said piston assembly further comprises a depth adjustment sleeve assembly for providing penetration to a predetermined desired depth.

5. The pneumatic spot weld drill of claim 1 wherein said piston assembly comprises a forward portion and a rear portion being securely connected by threads, a rear exterior portion of said piston assembly and rear interior surfaces of said drill housing assembly forming a volume for the introduction of said pressurized gas.

6. The pneumatic spot weld drill of claim 1 wherein said motor assembly is contained within said piston assembly.

7. The spot weld drill of claim 6 wherein said piston assembly comprises a piston end, said piston end cooperating with said spring bias means being positioned between said rear portion and said drill housing assembly for providing said piston assembly return pressure.

8. The spot weld drill of claim 1 wherein said control valve comprises a ball and spring bias means for controlling gas flow to said motor assembly.

9. The pneumatic spot weld drill of claim 3 wherein said motor assembly and said piston assembly move axially as an integral unit.

10. The pneumatic spot weld drill of claim 9 wherein said trigger assembly, comprises:
means for providing pressurized gas to a back side of said piston assembly when a trigger assembly is pulled, thereby providing said cutting pressure by moving said piston assembly and said motor assembly toward said spot weld.

11. The pneumatic spot weld drill of claim 10 wherein said spring bias means retracts said piston assembly and said motor assembly away from said spot weld.

12. A pneumatic spot weld drill, comprising:
a) a drill housing assembly including a trigger assembly for providing a supply of pressurized gas;
b) a piston assembly positioned within said drill housing assembly and axially translatable thereto, said piston assembly being actuated by said pressurized gas so as to provide cutting pressure for a drill bit;
c) a motor assembly contained within said drill housing assembly, said motor assembly having a rotatable output shaft, said output shaft for securing a drill bit and for providing rotary movement of said drill bit;
d) a control valve for receiving a supply of said pressurized gas and for controllably discharging said pressurized gas to said motor assembly, said control valve providing said cutting pressure at a desired level and providing rotary motion of said drill bit; and,
e) a removable C-arm assembly attachable to said drill housing assembly, said C-arm assembly having a leg which is hooked to a backside of a spot weld to be drilled, thereby providing reaction for said cutting pressure in drilling applications where both sides of the spot weld are accessible;
wherein said trigger assembly comprises:
a. means for providing pressurized gas to a back side of said piston assembly when a trigger of said trigger assembly is in a neutral position, thereby pushing said C-arm assembly forward in a direction away from the drill bit; and
b. means for providing pressurized gas to a front side of said piston assembly when said trigger is pulled, simultaneously releasing gas located at the back side of said piston assembly, thereby providing said cutting pressure by moving said C-arm assembly toward the drill bit.

* * * * *